UNITED STATES PATENT OFFICE.

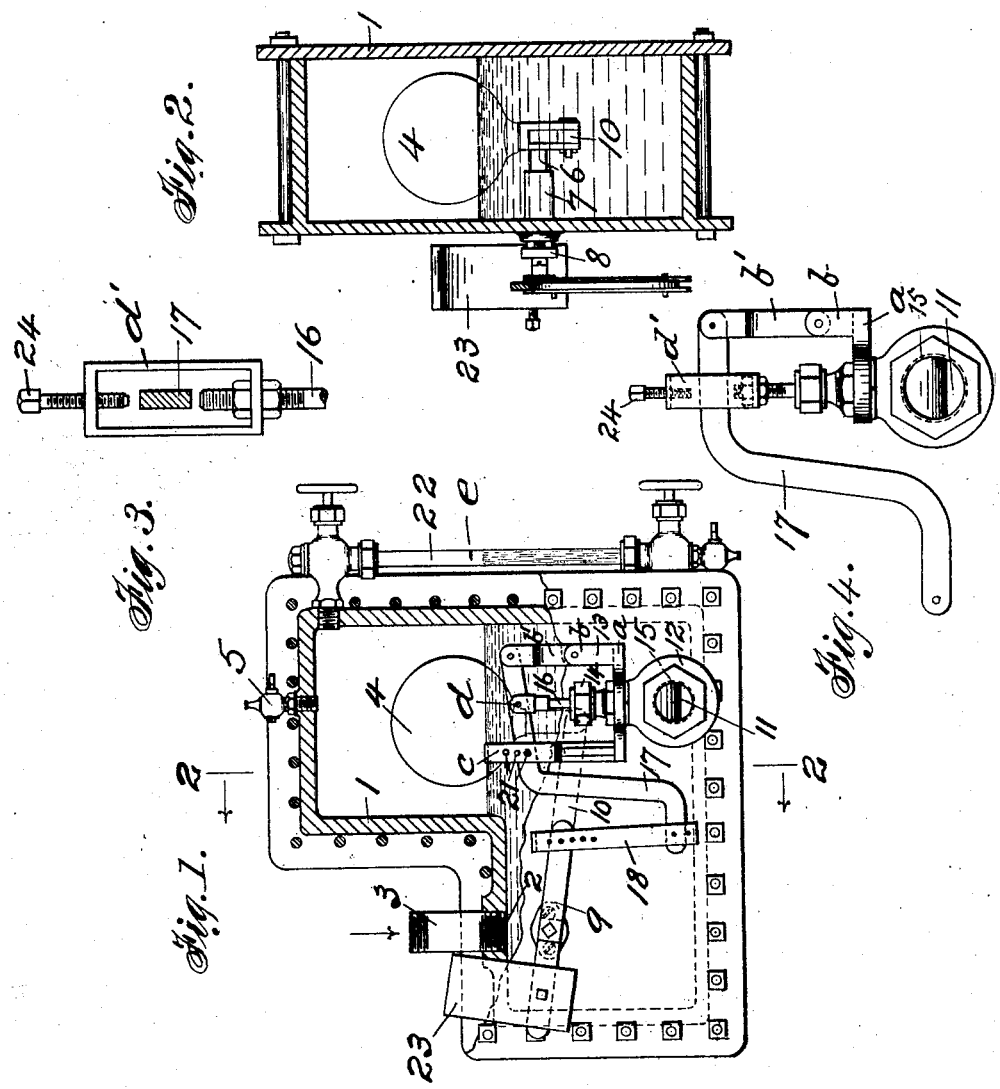

JOHN M. BURBY, OF ASTORIA, NEW YORK, ASSIGNOR OF ONE-HALF TO FRITZ MUSER, OF CHICAGO, ILLINOIS.

STEAM-TRAP.

978,842.

Specification of Letters Patent.   Patented Dec. 20, 1910.

Application filed July 2, 1910.   Serial No. 570,125.

*To all whom it may concern:*

Be it known that I, JOHN M. BURBY, a citizen of the United States, and a resident of Astoria, Long Island, county of Queens, and State of New York, have invented certain new and useful Improvements in Steam-Traps, of which the following is a full, clear, and exact specification, reference being had to the accompanying drawings, wherein—

Figure 1 is a front elevation, partly sectional view, of a steam trap constructed according to my invention; Fig. 2 a cross-sectional view thereof on line 2—2 indicated in Fig. 1; Fig. 3 a side-view; and Fig. 4 a front view of a modified construction of the device connecting the valve operating gear with the stem of the valve.

My invention relates to steam engineering appliances and consists of the herein shown and described improvements in the construction of steam traps, whereby loss of steam by blowing is safely and surely prevented under all conditions, the operating parts of the steam trap being made adjustable and arranged to permit such adjustment or regulation at all times according to the conditions and circumstances of the service for which the steam trap is employed, and means being provided, in connection with the steam trap, for observing and determining the extent of its operation relatively to the sealing of the inlet of the steam pipe into the trap and to the discharge of the condensation therefrom.

The construction and arrangement of the parts of my improved steam trap also afford the further advantage that any clogging of the valve, as would interfere with its operation, is promptly and clearly made apparent and thereby the loss of action of the steam trap avoided. The clogging of the valve, or any other cause, interfering with the effective operation of the trap is readily remedied without even disturbing its operations; it does not necessitate its being disconnected from the steam pipe and taken apart—which procedure is necessary with the steam traps heretofore in use.

The casing of my improved steam trap, designated 1 in the drawings, is L-shaped, the extension being made upwardly to provide a space for maintaining the water in the casing, above the level of inlet 2 so as to prevent live steam from entering into the steam trap, and a space above the level of the water for the float 4, to rise in, and to prevent any pressure being exerted upon the float, a vent-cock 5 is set in the top of the casing to relieve such pressure from time to time, or at times when observations are made of the operations of the trap, though the said vent-cock may as well be left open all the time. In the outlet pipe 15, set in the side wall of the casing 1 at the bottom thereof, a valve 11, set therein in casing 12 controls the outflow of the water from the trap. On the end of the rock-shaft 6, set in bearing 7, which projects through the side wall of the casing 1 and the stuffing box 8, the two-armed lever 9 is rigidly secured, and another lever, 10, is rigidly secured to its interiorly projecting end. The float 4 is pivotally attached to the free end of lever 10. Thus the rock-shaft 6 and the levers 9 and 10 constitute a crank, and the float 4 its actuating medium.

Frame 13, mounted on the stuffing box 14, comprises a perforated base $a$ and the posts $b$ and $c$. Post $b$ is extended by link $b'$, pivotally superimposed thereon, and one end of lever 17 is pivotally connected thereto. The upper end of post $c$ is looped and the lever 17 is passed through the loop. The stem 16 of the valve 11 passes through the base $a$ of frame 13, and the stuffing box 14, and a bifurcated head $d$, secured to its end, is pivotally connected to lever 17. The other end of this lever is pivotally connected by link 18 to the free end of lever 9. By means of the compound lever, composed of levers 9 and 17 and of the link 18, the float 4 is made to operate the valve. For adjusting the valve operating gear, a plurality of holes are provided in the ends of link 18, so its length may be varied by setting the pivots connecting it with levers 9 and 17 accordingly, and holes 21 are provided in the loop of post $c$, for setting in a stop-pin against which the lever 17 abuts in its upward motion. By these means, the point at which the valve 11 is opened, and also the extent of its lift, are determined.

The described gear for operating the valve 11 by the movements of the float 4, is designed with the object in view, 1st to sufficiently multiply the force, created by the buoyancy of the float, to operate the valve; and 2d to time and vary, increase or decrease, the discharge of the water from the trap. The first object is attained by making lever 9 so much shorter than lever 10, whereon the float 4 acts, and by combining the lever 17 with lever 9 and with the stem 16 of the valve, in the manner shown and described. The second object is attained by making the described valve gear adjustable so the extent and also the timing of the start and termination of the motions of the valve 11, are regulated.

The float 4 is actuated by the rising and falling of the level of water in the trap casing and the efficiency of the trap, as means for preventing waste of steam, depends not only upon maintaining the water in the casing at such a level as will effectively seal the inlet 2 against the entry of any steam from pipe 3 into the trap, by also upon effecting a discharge of all water from the trap above the level required to be maintained therein for sealing the inlet, and not more. To this end the gear operating the valve 11 must be regulated or adjusted according to the requirements of the particular apparatus in connection with which the trap is used. A trap adjusted to an apparatus, wherein a nearly steady pressure of fifteen pounds is maintained, would not operate satisfactorily if connected to some other apparatus, wherein the steam pressure would be more or less, or vary between distant limits. The described mechanism to not only discharge all surplus water of condensation, but also enables the trap to be adjusted to safely keep the steam, in the pipe in any apparatus, using low or high, or constant or varying steam pressure. The higher or more fluctuating the pressure is, the longer must the opening of the outlet valve be delayed and the quicker its closing. Of course, the adjustment must be made by the attendant in charge of the apparatus; the mechanism will not adjust itself automatically, and the attendant must observe the working of the trap during this period of adjustment. To enable him to observe the fluctuations in the level of the water in the trap casing, the gage 22 is provided, connecting with the interior of the casing at or near the bottom thereof and at or near the top of the air-space in the extended portion of the casing. A mark on the glass tube of the gage like the one designated e in the drawing, may be made to indicate the level at which the water in the trap casing should be maintained. If the water falls below this level, it shows that the valve is held open too long, and to remedy this, the connection between levers 9 and 17 must be extended and vice-versa. If the water is discharged too abruptly or rapidly, or if more water is discharged than necessary to reduce it to the required level, the extent of the opening of the valve may be reduced by limiting the extent to which the valve may be opened.

This is done by inserting a stop-pin into one of the holes 21 in post c of the valve gear frame, to stop the upward motion of lever 17, before the valve 11 is fully opened. The balancing weight 23, adjustably secured on lever 9, serves in the position, shown in Fig. 1 of the drawing, to assist the float to open the valve, but it may also be used on the other arm of the lever 9 to assist in closing the valve. This balancing weight is not essential and may be omitted.

In Figs. 3 and 4 a modified construction of the valve operating mechanism is shown, in which the post c of the valve frame is omitted, the stem 16 of the valve is screw-threaded, and a looped head $d'$ is secured thereon. The top of the head $d$ is tapped for the set screw 24 and by screwing the head $d'$ farther onto the stem 16 and screwing in the set screw 24 into the head, the opening and closing of the valve may be timed and the extent of the opening of the valve increased or reduced.

The arrangement of the valve, and of its operating mechanism, on the outside of the casing, gives ready access to these operating parts of the trap for adjustment, and results also in the great advantage of my improved trap as compared with such traps as were heretofore known, in which the valve and its operating mechanism are located within the casing. Traps of such construction must be opened and may also have to be disconnected for cleaning, whereas, to discharge whatever sediment may accumulate in the casing of my improved trap, it is only necessary to disconnect link 18 from either lever 9 or 17, whereupon valve 11 may be opened and held open by lifting lever 17. The pressure of the steam then blows the water, and all sediment with it, out of the casing.

I claim as my invention:

1. A steam trap, comprising a casing, an inlet in the casing, adapted for connection with the steam pipe; one part of the said casing being extended above the level of the inlet; an outlet at the bottom of the casing; an outlet pipe, communicating with the outlet; a valve set in the outlet pipe exteriorly of the steam trap; a rock-shaft set transversely in the casing; a lever rigidly connected to the rock-shaft inside of the casing; a float connected to the free end of the lever; and an adjustable compound lever, operatively connected to the valve and having one member rigidly connected to the rock-shaft; substantially as herein shown and described.

2. A steam trap, comprising a casing, an inlet in the casing, adapted for connection with the steam pipe; one part of the said casing being extended above the level of the inlet; an outlet at the bottom of the casing; an outlet pipe, communicating with the outlet; a valve set in the outlet pipe exteriorly of the steam trap; a gage communicating with the casing at or near the bottom thereof, and at or near the top of the extended part thereof; a rock-shaft set transversely in the casing; a lever rigidly connected to the rock-shaft inside of the casing; a float connected to the free end of the lever; and an adjustable compound lever, operatively connected to the valve and having one member rigidly connected to the rock-shaft; substantially as herein shown and described.

3. A steam trap, comprising a casing, an inlet in the casing, adapted for connection with the steam pipe; one part of the said casing being extended above the level of the inlet; an outlet at the bottom of the casing; an outlet pipe, communicating with the outlet; a valve set in the outlet pipe exteriorly of the steam trap; a rock-shaft set transversely in the casing; a lever rigidly connected to the rock-shaft inside of the casing; a float connected to the free end of the lever; a second lever rigidly connected to the rock-shaft on the outside of the casing; a gear for operating the valve, and a link, adjustably connecting the valve operating gear with the free end of the lever secured to the rock-shaft on the outside of the casing; substantially as herein shown and described.

4. A steam trap, comprising a casing, an inlet in the casing, adapted for connection with the steam pipe; one part of the said casing being extended above the level of the inlet; an outlet at the bottom of the casing; an outlet pipe, communicating with the outlet; a valve set in the outlet pipe exteriorly of the steam trap; a gage communicating with the casing at or near the bottom thereof, and at or near the top of the extended part thereof; a rock-shaft set transversely in the casing; a lever rigidly connected to the rock-shaft inside of the casing; a float connected to the free end of the lever; a second lever rigidly connected to the rock-shaft on the outside of the casing; a gear for operating the valve, and a link, adjustably connecting the valve operating gear with the free end of the lever secured to the rock-shaft on the outside of the casing; substantially as herein shown and described.

JOHN M. BURBY.

Witnesses:
VERONICA BRAUN,
AGNES F. MADDEN.